(12) United States Patent
Yokouchi et al.

(10) Patent No.: US 10,882,322 B2
(45) Date of Patent: Jan. 5, 2021

(54) IMAGE DATA PROCESSING METHOD AND PRINTING SYSTEM

(71) Applicant: SCREEN HOLDINGS CO., LTD., Kyoto (JP)

(72) Inventors: Kenichi Yokouchi, Kyoto (JP); Rui Yamaguchi, Kyoto (JP)

(73) Assignee: SCREEN HOLDINGS CO., LTD., Kyoto (JP)

(*) Notice: Subject to any disclaimer, the term of this patent is extended or adjusted under 35 U.S.C. 154(b) by 0 days.

(21) Appl. No.: 16/351,951

(22) Filed: Mar. 13, 2019

(65) Prior Publication Data

US 2019/0283440 A1 Sep. 19, 2019

(30) Foreign Application Priority Data

Mar. 14, 2018 (JP) .................... 2018-046235

(51) Int. Cl.
*B41J 2/17* (2006.01)
*B41J 2/175* (2006.01)
*H04N 1/00* (2006.01)
*H04N 1/41* (2006.01)
*H04N 1/23* (2006.01)

(52) U.S. Cl.
CPC ...... *B41J 2/17566* (2013.01); *H04N 1/00832* (2013.01); *H04N 1/00925* (2013.01); *H04N 1/2346* (2013.01); *H04N 1/41* (2013.01); *B41J 2002/17569* (2013.01)

(58) Field of Classification Search
None
See application file for complete search history.

(56) References Cited

U.S. PATENT DOCUMENTS

| 6,027,200 A * | 2/2000 | Takahashi | A41H 3/007 347/19 |
|---|---|---|---|
| 2005/0213141 A1 | 9/2005 | Savov | |
| 2007/0070454 A1* | 3/2007 | Ernst | H04N 1/46 358/504 |
| 2009/0016748 A1 | 1/2009 | Ferlitsch | |
| 2013/0057606 A1 | 3/2013 | Rice et al. | |
| 2013/0293925 A1 | 11/2013 | Davies | |
| 2018/0032293 A1 | 2/2018 | Sakurai et al. | |

FOREIGN PATENT DOCUMENTS

JP 2018-015964 A 2/2018

* cited by examiner

*Primary Examiner* — Erica S Lin
(74) *Attorney, Agent, or Firm* — McDermott Will & Emery LLP

(57) ABSTRACT

An image data processing method for estimating an ink consumption amount includes: an image data compression step of compressing image data after RIP processing by run-length encoding; and an ink consumption amount estimation step of calculating a predicted ink consumption amount when printing based on image data is performed by an inkjet printing device based on information on the number of occurrences for each gradation value obtained when run-length encoding is applied to image data and information on an ink consumption amount for each gradation value held in an ink consumption amount table prepared in advance.

9 Claims, 13 Drawing Sheets

| GRADATION VALUE | INK CONSUMPTION AMOUNT |
|---|---|
| 0 | 0 |
| 1 | 0.009 |
| 2 | 0.019 |
| ⋮ | ⋮ |
| 128 | 1.185 |
| ⋮ | ⋮ |
| 254 | 2.451 |
| 255 | 2.463 |

IMAGE DATA PROCESSING METHOD AND PRINTING SYSTEM

BACKGROUND OF THE INVENTION

Field of the Invention

The present invention relates to an image data processing method for estimating an ink consumption amount at the time of printing by an inkjet printing device.

Description of Related Art

Conventionally, there have been known inkjet printing devices that perform printing by ejecting ink onto a base material (printing paper or the like) by heat or pressure. If the ink runs short while printing is being executed by the inkjet printing device, a desired printed matter cannot be obtained, resulting in a large amount of waste occurring in the ink, the base material, and the like. Therefore, an inkjet printing device having a function of executing a process of estimating in advance the amount of ink consumed at the time of printing (hereinafter referred to as "ink consumption amount estimation processing") has also been developed. According to such an inkjet printing device, the user can refill the ink in advance when shortage of the ink is predicted, thereby suppressing the occurrence of waste of ink, base material, and the like. In addition, the above function may be used in order to estimate in advance the cost required for printing.

The ink consumption amount estimation processing is described in Japanese Laid-Open Patent Publication No. 2018-15964, for example. According to the invention disclosed in Japanese Laid-Open Patent Publication No. 2018-15964, image data to be printed are corrected by using adjustment data that are data for adjusting the ejection amount of ink for each inkjet printing device. Then, the ink consumption amount is estimated based on the corrected image data. For this reason, the ink consumption amount at the time of printing is estimated with high accuracy.

According to the conventional method, the ink consumption amount estimation processing is performed roughly in the following procedure.
(a) Image data after RIP processing are saved as a file (for example, compressed TIFF file) in the disk.
(b) Bitmap expansion on the image data saved in the file onto the memory is performed.
(c) A histogram is generated by counting the number of pixels for each gradation value based on the bitmap data.
(d) A predicted ink consumption amount is calculated by performing a product-sum operation on the ink consumption amount and the number of pixels by using information on the ink consumption amount for each gradation value (this information is prepared in advance typically in the form of a table) and the histogram.

The process (a) is also executed when the ink consumption amount estimation processing is not performed.

As described above, according to the conventional method, calculation cost is extremely high because it is necessary to perform a process of bitmap expansion on image data onto a memory from a file saved in a disk and a process of counting the number of pixels for each gradation value (a process of generating a histogram). For example, in some cases, it is necessary to perform a product-sum operation for several hundreds of millions of pixels per sheet, requiring a great amount of processing time. Accordingly, depending on the performance of the device that executes the ink consumption amount estimation processing, it is difficult to simultaneously execute the ink consumption amount estimation processing and another processing without hindering the operation of the inkjet printing device.

SUMMARY OF THE INVENTION

An object of the present invention is therefore to provide a method (image data processing method) for estimating at a speed higher than ever an ink consumption amount at the time of printing by an inkjet printing device.

One aspect of the present invention is directed to an image data processing method, including:

an image data compression step of compressing image data after RIP processing by run-length encoding; and an ink consumption amount estimation step of calculating a predicted ink consumption amount when printing based on the image data is performed by an inkjet printing device based on information on the number of occurrences for each gradation value obtained when run-length encoding is applied on the image data and information on an ink consumption amount for each gradation value held in an ink consumption amount table prepared in advance.

According to such a configuration, information on the number of occurrences for each gradation value necessary for estimating the ink consumption amount is obtained when compression is applied to the image data after the RIP processing. Accordingly, when estimating the ink consumption amount, it is unnecessary to perform a process of bitmap expansion on the image data onto the memory from a file saved in the disk and a process of counting the number of pixels for each gradation value. For this reason, it is possible to estimate at a speed higher than ever the ink consumption amount at the time of printing by the inkjet printing device. This makes it easy to simultaneously execute the ink consumption amount estimation processing and another processing by one device without hindering the operation of the inkjet printing device.

Another aspect of the present invention is directed to a printing system including an image processing device configured to perform RIP processing and an inkjet printing device, the printing system further including:

an image data compression unit configured to compress image data after RIP processing by the image processing device by run-length encoding;

an ink consumption amount table that holds information on an ink consumption amount for each gradation value; and an ink consumption amount estimation unit configured to calculate a predicted ink consumption amount when printing based on the image data is performed by the inkjet printing device based on information on the number of occurrences for each gradation value obtained when the image data compression unit applies run-length encoding to the image data and information on an ink consumption amount for each gradation value held in the ink consumption amount table.

Still another aspect of the present invention is directed to an image data processing method, including:

a compressed file analysis step of reading, without decompressing, a compressed file in which image data after RIP processing have been compressed by run-length encoding and acquiring information on the number of occurrences for each gradation value from encoded data; and an ink consumption amount estimation step of calculating a predicted ink consumption amount when printing based on the image data is performed by an inkjet printing device based on information on the number of occurrences for each gradation value obtained in the compressed file analysis step and information on an ink consumption amount for each gradation value held in an ink consumption amount table prepared in advance.

According to such a configuration, information on the number of occurrences for each gradation value necessary for estimating the ink consumption amount is obtained by reading the compressed file after the RIP processing without decompressing it. Accordingly, when estimating the ink consumption amount, it is unnecessary to perform a process of bitmap expansion on image data onto the memory from a file saved in the disk and a process of counting the number of pixels for each gradation value. For this reason, it is possible to estimate at a speed higher than ever the ink consumption amount at the time of printing by the inkjet printing device. This makes it easy to simultaneously execute the ink consumption amount estimation processing and another processing by one device without hindering the operation of the inkjet printing device.

These and other objects, features, modes, and advantageous effects of the present invention will become more apparent from the following detailed description of the present invention with reference to the accompanying drawings.

DETAILED DESCRIPTION OF PREFERRED EMBODIMENTS

Hereinafter, preferred embodiments of the present invention will be described with reference to the drawings.

1. First Embodiment

<1.1 Overview of Printing System>

Figure 1:
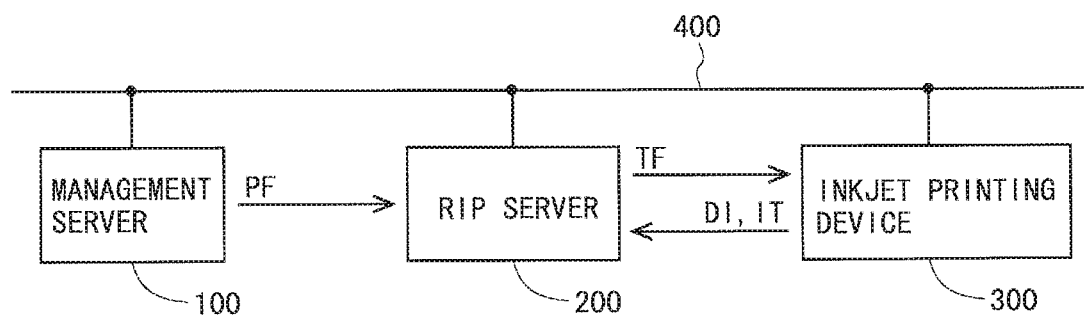
FIG. 1 is an overall configuration diagram of a printing system according to a first embodiment of the present invention.

FIG. 1 is an overall configuration diagram of a printing system according to a first embodiment of the present invention. This printing system is composed of a management server 100, a RIP server 200, and an inkjet printing device 300. The management server 100, the RIP server 200, and the inkjet printing device 300 are communicably connected to each other via a communication line 400. The management server 100 manages execution of printout. The RIP server 200 performs RIP processing (rasterization processing) on submitted data. That is, the RIP server 200 is an image processing device that performs RIP processing. The inkjet printing device 300 performs color printing.

In the present embodiment, a PDF file PF is provided as submitted data from the management server 100 to the RIP server 200. In the RIP server 200, RIP processing is performed on the PDF file PF, and image data after the RIP processing (that is, image data in bitmap format) are saved as a TIFF file TF in a compressed format. The TIFF file TF is sent to the inkjet printing device 300, and the inkjet printing device 300 executes printout based on the decompressed image data of the TIFF file TF.

Incidentally, in the present embodiment, ink consumption amount estimation processing is performed in the RIP server 200 in order to determine whether the ink will run short during execution of printing. Device information DI and an ink consumption amount table IT are sent from the inkjet printing device 300 to the RIP server 200 as data necessary for executing the ink consumption amount estimation processing. A detailed description of the device information DI and the ink consumption amount table IT will be described later.

In the printing system according to the present embodiment, when the operator instructs the inkjet printing device 300 to execute printout, the RIP server 200 performs RIP processing on the corresponding printing job. The image data after the RIP processing are sent to the inkjet printing device 300 as a TIFF file TF without an operation of the operator. Then, printout based on the TIFF file TF having been received is executed in the inkjet printing device 300.

<1.2 Configuration of Inkjet Printing Device>

Figure 2:
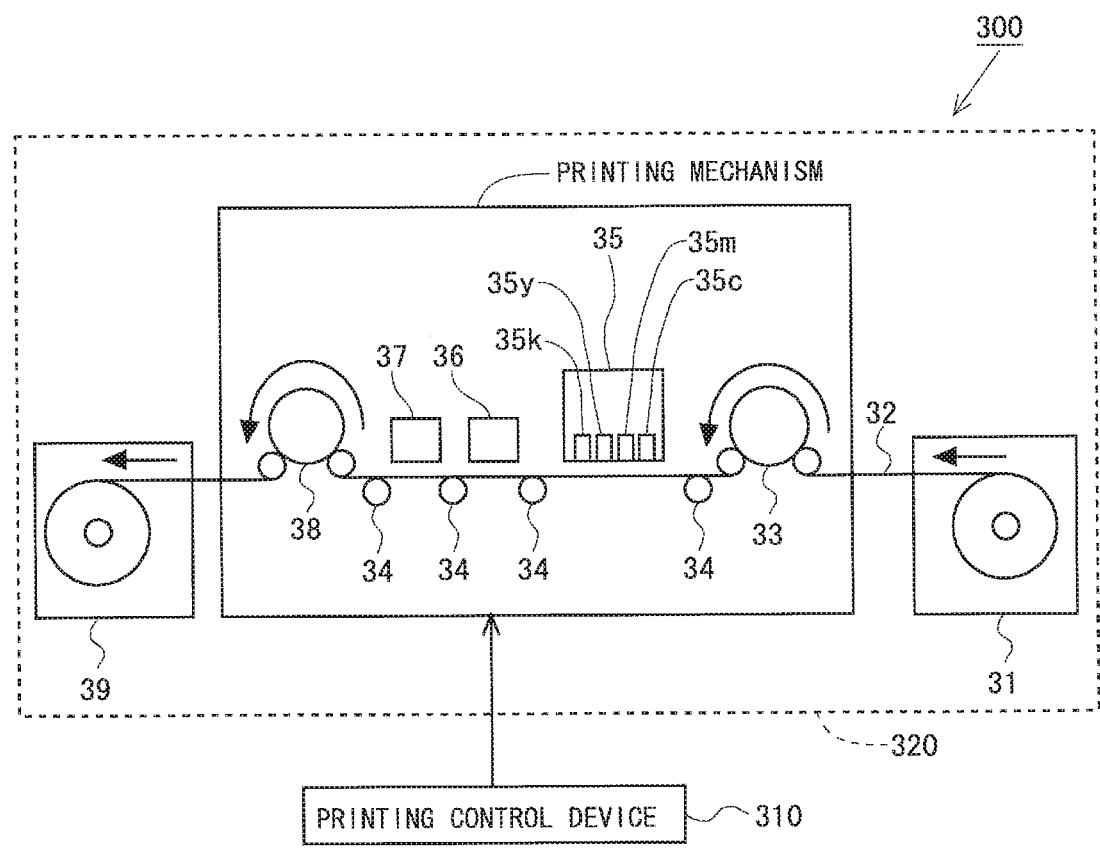
FIG. 2 is a schematic diagram showing one configuration example of an inkjet printing device in the first embodiment.

FIG. 2 is a schematic diagram showing one configuration example of the inkjet printing device 300 in the present embodiment. This inkjet printing device 300 is composed of a printing machine main body 320 and a printing control device 310 that controls the printing machine main body 320.

The printing machine main body 320 includes: a paper feeding unit 31 that supplies printing paper (for example, roll paper) 32 as a base material; a first driving roller 33 for conveying the printing paper 32 to an inside of a printing mechanism; a plurality of supporting rollers 34 for conveying the printing paper 32 in the printing mechanism; a printing unit 35 that performs printing by ejecting ink to the printing paper 32; a drying unit 36 that dries the printing paper 32 after printing; an inspection unit 37 that inspects the state of printing onto the printing paper 32; a second driving roller 38 for outputting the printing paper 32 from the inside of the printing mechanism; and a paper winding unit 39 that winds up the printing paper 32 after printing. As described above, the printing paper 32 is conveyed from the paper feeding unit 31 towards the paper winding unit 39 in a constant conveying direction by the first driving roller 33 and the second driving roller 38. The printing unit 35 includes a C inkjet head 35*c*, an M inkjet head 35*m*, a Y inkjet head 35*y*, and a K inkjet head 35*k*, which ejects ink of C (cyan), M (magenta), Y (yellow), and K (black), respectively. Note that a plurality of inkjet heads are provided for each of the colors.

The printing control device 310 controls the operation of the printing machine main body 320 having the above-described configuration. When a printout instruction command is given to the printing control device 310, the printing control device 310 controls the operation of the printing machine main body 320 so that the printing paper 32 is conveyed from the paper feeding unit 31 to the paper winding unit 39. In the conveyance process of the printing paper 32, first, printing is performed by ejecting ink from each of the inkjet heads 35*c*, 35*m*, 35*y*, and 35*k* in the printing unit 35, then the drying unit dries the printing paper 32, and finally, the inspection unit 37 inspects the printing state.

While the configuration of the inkjet printing device 300 that performs color printing has been given as an example here, the present invention can also be applied to a case where an inkjet printing device that performs monochrome printing is adopted. While the configuration of the inkjet printing device 300 that uses aqueous ink has been given as an example here, the present invention can also be applied to a case where an inkjet printing device that uses UV ink (ultraviolet curable ink) such as an inkjet printing device for label printing is adopted.

<1.3 Configuration of RIP Server>
<1.3.1 Hardware Configuration>

Figure 3:
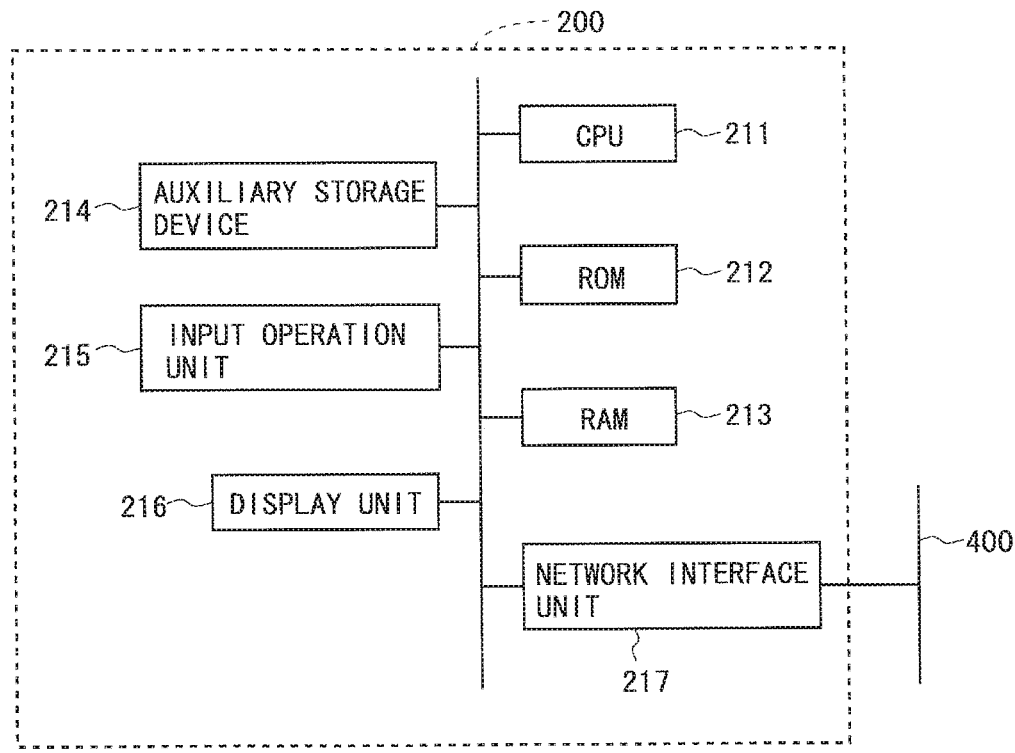
FIG. 3 is a hardware configuration diagram of a RIP server in the first embodiment.

FIG. 3 is a hardware configuration diagram of the RIP server 200 in the present embodiment. The RIP server 200 has a CPU 211, a ROM 212, a RAM 213, an auxiliary storage device 214, an input operation unit 215 such as a keyboard, a display unit 216, and a network interface unit 217. The PDF file PF sent from the management server 100 via the communication line 400 is inputted to the inside of the RIP server 200 via the network interface unit 217 and is stored in the auxiliary storage device 214. The TIFF file TF generated by the RIP server 200 is temporarily stored in the auxiliary storage device 214 and then sent from the network interface unit 217 to the inkjet printing device 300 via the communication line 400. In the present embodiment, a program (image data processing program) for a series of processing (image data processing) to be performed when an instruction of execution of RIP processing is issued is stored in the auxiliary storage device 214. The image data processing program is read out from the auxiliary storage device 214 to the RAM 213 by a predetermined operation by the operator, and the CPU 211 executes the image data processing program read into the RAM 213.

<1.3.2 Functional Configuration>

Figure 4:
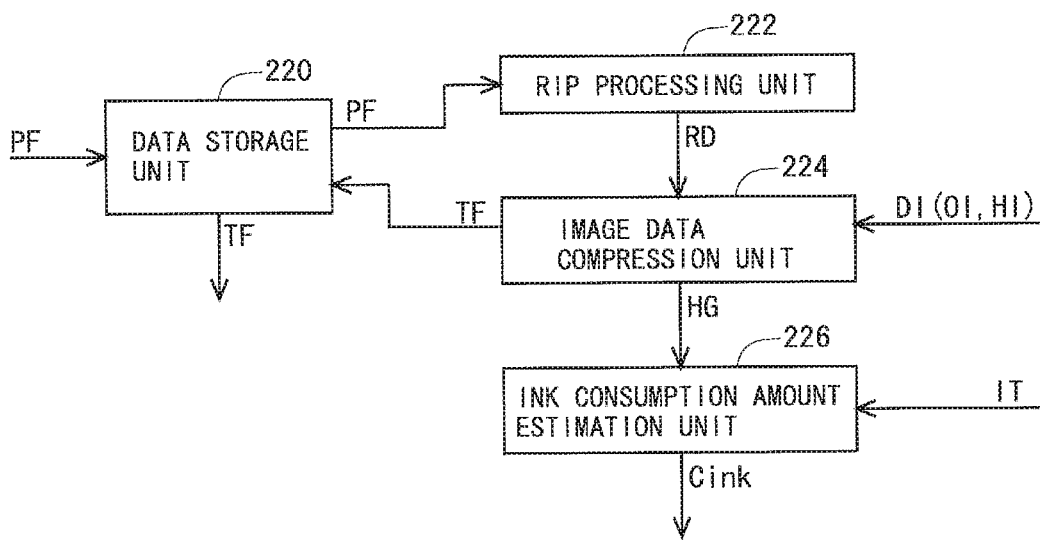
FIG. 4 is a functional block diagram showing a configuration of a function realized by the RIP server by executing an image data processing program in the first embodiment.

FIG. 4 is a functional block diagram showing the configuration of a function realized in the RIP server 200 by executing the image data processing program. As shown in FIG. 4, the RIP server 200 is functionally provided with a data storage unit 220, a RIP processing unit 222, an image data compression unit 224, and an ink consumption amount estimation unit 226.

The data storage unit 220 stores the PDF file PF sent from the management server 100 and the TIFF file TF generated by the image data compression unit 224. It should be noted that the data storage unit 220 corresponds to the auxiliary storage device 214 as a hardware. The RIP processing unit 222 generates image data (referred to as "RIP data") RD in the bitmap format by performing the RIP processing (rasterization processing) on the PDF file PF. The image data compression unit 224 applies compression by run-length encoding to the RIP data RD, thereby generating a TIFF file TF. At that time, the image data compression unit 224 generates a histogram HG that indicates the number of occurrences (frequency) for each gradation value for the RIP data RD with reference to the device information DI (offset information OI and head information HI) sent from the inkjet printing device 300. It should be noted that a detailed description of the process of generating the histogram HG will be described later. The ink consumption amount estimation unit 226 calculates a predicted ink consumption amount Cink at the time of printing by the inkjet printing device 300 on the basis of information on the number of occurrences for each gradation value obtained from the histogram HG generated by the image data compression unit 224 and information on the ink consumption amount for each gradation value held in the ink consumption amount table IT sent from the inkjet printing device 300. Details of the image data processing executed by these functional components will be described below.

<1.4 Image Data Processing Method>
<1.4.1 Outline>

Figure 5:
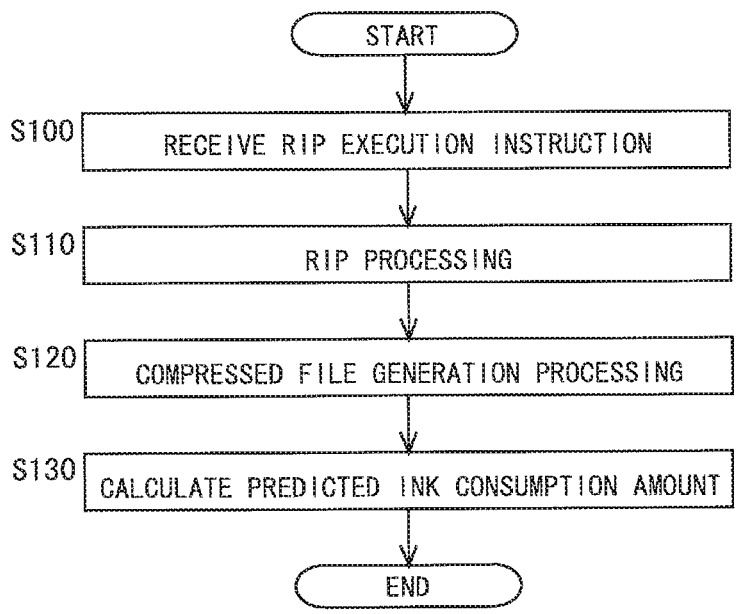
FIG. 5 is a flowchart showing a procedure of image data processing in the first embodiment.

FIG. 5 is a flowchart showing the procedure of image data processing in the present embodiment. Here, it is assumed that the PDF file PF sent from the management server 100 has already been stored in the data storage unit 220. In addition, here, the flow of processing will be described focusing on any one color.

First, in the inkjet printing device 300, the operator designates a printing job and gives an instruction of execution of printout. Due to this, a command that gives an instruction of execution of the RIP process for the corresponding printing job (hereinafter referred to as a "RIP execution instruction") is sent from the inkjet printing device 300 to the RIP server 200. The RIP processing unit 222 receives the RIP execution instruction (step S100). Then, in response to the RIP execution instruction, the RIP processing unit 222 reads out the PDF file PF stored in the data storage unit 220 and performs RIP processing on the PDF file PF (step S110). As a result, RIP data RD are generated.

Next, the image data compression unit 224 applies compression by run-length encoding to the RIP data RD generated in step S110, thereby generating a TIFF file TF (step S120). In the present embodiment, more specifically, the TIFF file TF is generated by applying Packbits compression to the RIP data RD. It should be noted that, in the following description, the processing performed in step S120 will be referred to as "compressed file generation processing".

Here, the Packbits compression will be described. In the Packbits compression, the size of data is reduced by performing encoding with the following rule (N is a natural number in the following). When a same character (also called a "symbol") is continuous for N times, the value of "−N+1" (integer from −127 to −1) is set to the first byte and the corresponding character is set to the second byte. For example, data in which "a" is continuous for four times as in "aaaa" are encoded as "−3a". When non-repetitive characters are continuous for N times, the value of "N−1" (integer from 0 to 127) is set to the first byte and the corresponding N characters are set from the second byte to the (N+1)th byte. For example, the data "abcd" are encoded as "3abcd". As described above, with respect to the first byte, one bit out of the eight bits is used for a sign indicative of positive and negative. Accordingly, the maximum value of the expressible number of times of continuation is 128, which is the maximum value expressible with 7 bits. Therefore, if the same character continues 129 times or more or if there are 129 or more non-repetitive characters, they are divided when encoding is performed.

Figure 6:
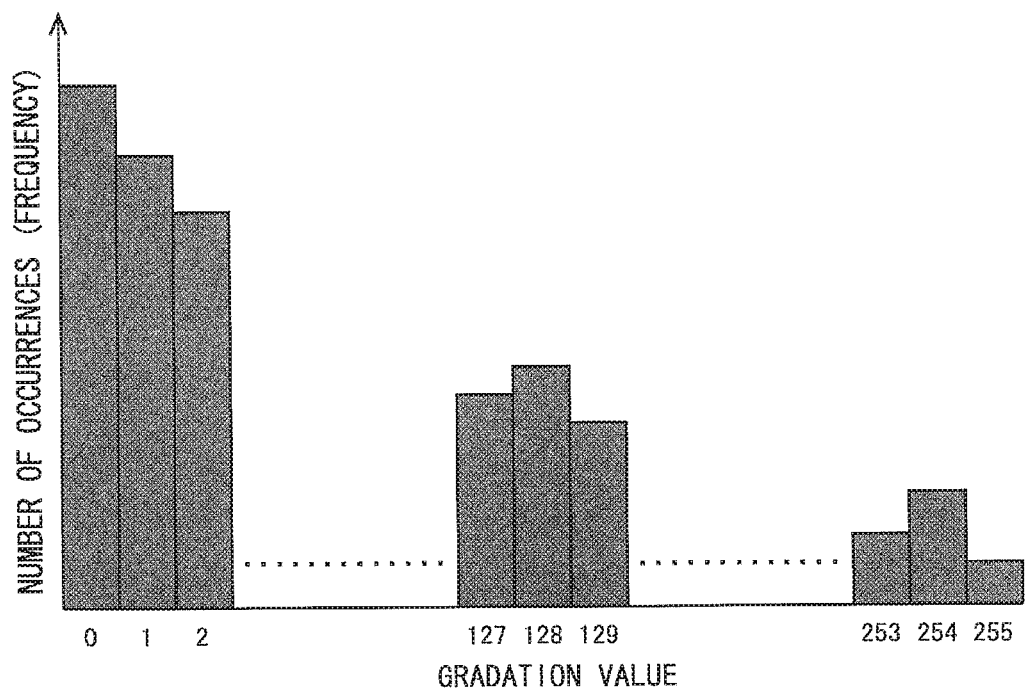
FIG. 6 is a chart showing an example of a histogram in the first embodiment.

In step S120, the image data compression unit 224 further generates the histogram HG indicative of the number of occurrences (frequency) for each gradation value for the RIP data RD. In this regard, since the RIP data RD are composed of data of gradation values, when the Packbits compression as described above is performed on the RIP data RD, each gradation value is treated as a character (symbol), and the number of occurrences for each gradation value will be counted. Accordingly, it is possible to generate the histogram HG using the information obtained by the count. The histogram HG is expressed as shown in FIG. 6, for example. Internally, the histogram HG is realized by variables (for example, variables such as Cnt(0) to Cnt(255)) prepared for respective gradation values for storing the number of occurrences of corresponding gradation value.

Figures 7, 8:
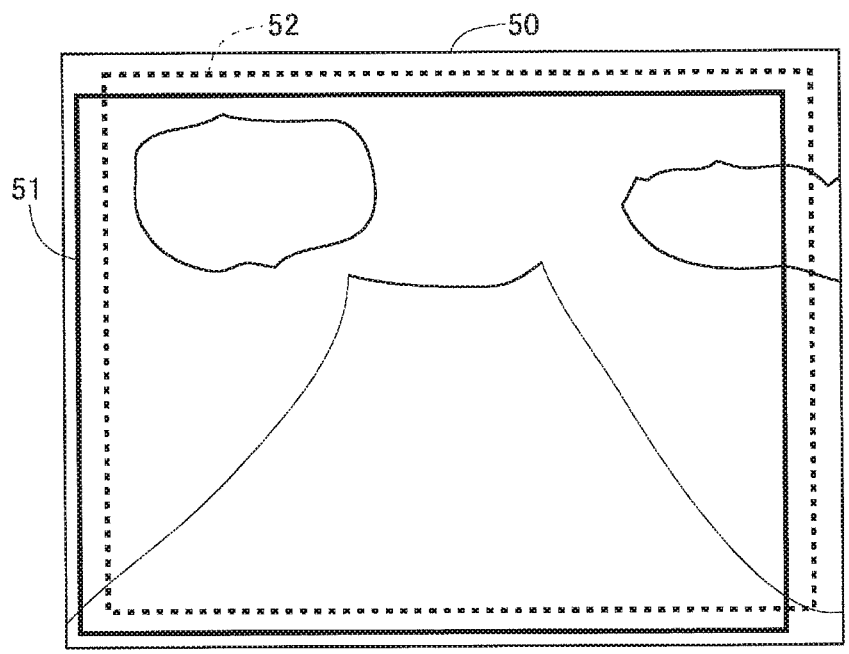
FIG. 7 is a view showing an example of an ink consumption amount table in the first embodiment.
FIG. 8 is an illustration for explaining that the printing position of each pixel is determined depending on an offset in the first embodiment.

When only one histogram is used for the entire sheet corresponding to the RIP data RD, it is not possible to obtain sufficient precision regarding prediction of the ink consumption amount. This is because, in the inkjet printing device, the ink consumption amount may be different even with the same gradation value due to the individual difference of the nozzles and the individual difference of the inkjet heads. Then, ideally, it is preferable to prepare for each nozzle the ink consumption amount table IT, which is a look-up table holding information on the ink consumption amount for each gradation value as shown in FIG. 7 (The gradation value in FIG. 7 is varied by combining the type of ink droplet size (e.g., non-ejection, S size, M size, and L size) and the occurrence probability of ink droplets of each of the ink droplet sizes. Accordingly, the ink consumption amount of each gradation value is expressed by the number obtained by multiplying the ink amount of the ink droplet size corresponding to the gradation value by the occurrence probability thereof. For example, if the gradation value "1" is a droplet of "S size" and the occurrence probability of 10%, the ink consumption amount of the gradation value "1" is indicated by the number "0.009 picoliters", which is obtained by multiplying the liquid amount of the S size ink droplet "0.09 picoliters" by the occurrence probability of 10%. However, under the condition of "520 mm width, 1200 dpi" for example, since the number of nozzles is about 25,000, it becomes necessary to prepare 25,000 pieces of the ink consumption amount table IT. Then, the memory usage amount by the ink consumption amount table IT becomes enormous. Therefore, it is not feasible to prepare the ink consumption amount table IT for each nozzle. With respect to this point, in recent years, improvement in processing accuracy of the nozzle is remarkable due to the advancement of the technology of MEMS to be mounted on the inkjet head. As a result, the individual difference of nozzles has become small, and even if only the individual difference of inkjet heads is taken into consideration, a practically sufficient accuracy can be obtained with respect to prediction of the ink consumption amount.

Therefore, in the present embodiment, the ink consumption amount table IT and the histogram HG are prepared for each group with one inkjet head regarded as one group. For each group, the ink consumption amount is estimated using the ink consumption amount table IT and the histogram HG. As a result, the prediction accuracy of the ink consumption amount is improved while suppressing an increase in the memory usage amount. It should be noted that the ink consumption amount table IT corresponding to each group can be created based on an average value (average value of the ink consumption amount for each gradation value) of data of all the nozzles included in the inkjet head corresponding to the corresponding group, after obtaining the ink consumption amount for each gradation value for each nozzle.

As described above, in step S120, generation of the histogram HG for each group is performed, in addition to generation of the TIFF file TF, which is a compressed file.

After that, the predicted ink consumption amount Cink is calculated by the ink consumption amount estimation unit 226 (step S130). In this regard, information on the number of occurrences for each gradation value is obtained from the histogram HG (see FIG. 6), and information on the ink consumption amount for each gradation value is obtained from the ink consumption amount table IT (see FIG. 7). The histogram HG and the ink consumption amount table IT are prepared for each group (for each inkjet head). Accordingly, a predicted value Cgrp of the ink consumption amount for each group is obtained by calculating the sum of products of the number of occurrences and the ink consumption amount for all the gradation values for each group. For example, in a case where a gradation value i can have a value from 0 to 255, when the number of occurrences for each gradation value is denoted as Cnt(i) and the ink consumption amount corresponding to each gradation value is denoted as Ca(i), the predicted value Cgrp is calculated by the product-sum operation expressed by the following Equation (1) specifically.

[Equation 1]

$$Cgrp = \sum_{i=0}^{255}(Cnt(i) \times Ca(i)) \qquad (1)$$

Then the sum of the predicted values Cgrp for all the inkjet heads is calculated, thereby giving the predicted ink consumption amount Cink by the execution of the corresponding printing job. As a result, the image data processing of the flow shown in FIG. 5 ends.

It should be noted that the TIFF file TF generated in step S120 is sent from the RIP server 200 to the inkjet printing device 300. Then, the inkjet printing device 300 executes printout based on the TIFF file TF. Here, in a case where, as a result of calculation of the predicted ink consumption amount Cink in step S130, it is determined that execution of printout causes the ink to run short, a warning message or the like may be displayed on the display unit of the printing control device 310 without starting printout in the inkjet printing device 300, for example.

The above description focuses on one color. When the inkjet printing device 300 having the configuration shown in FIG. 2 is adopted, however, generation of the TIFF file TF and calculation of the predicted ink consumption amount Cink are performed for each of the four colors. Accordingly, the ink consumption amount table IT is prepared for each color, and generation of the histogram HG is also performed for each color.

It should be noted that, in the present embodiment, the image data compression step is realized by step S120, and the ink consumption amount estimation step is realized by step S130.

<1.4.2 Details of Compressed File Generation Processing>

Next, the compressed file generation process (step S120 in FIG. 5) will be described in detail. As described above, in the present embodiment, the ink consumption amount table IT is prepared for each group, and the histogram HG is generated for each group. Then, the predicted value Cgrp of the ink consumption amount is once calculated for each group. In order to realize this, it is necessary to understand the correspondence relationship between the position of each pixel in the RIP data RD and a printing area of each inkjet head. In this regard, in the present embodiment, at the start of the compression processing, the printing position (the printing position on the printing paper) of each pixel in the RIP data RD has been determined. More specifically, the printing position of each pixel is determined according to the offset that is set in the inkjet printing device 300. For example, in the case where the image indicated by the RIP data RD is a rectangular image given the reference numeral 50 in FIG. 8, depending on the offset, the rectangular area given the reference numeral 51 may become the actual printing area or the rectangular area given the reference numeral 52 may become the actual printing area. Also, focusing on one pixel, the printing position of the pixel may be included in the printing area of a certain inkjet head, the printing position of the pixel may be included in the printing area of another inkjet head, or the pixel may be located in a non-printing area. Based on the above, an accurate calculation of the predicted ink consumption amount Cink is made possible by predicting the ink consumption amount for each group based on the correspondence relationship (which can be estimated from device information such as offset information described later) between the position of each pixel and the printing area of each inkjet head.

Figure 9:
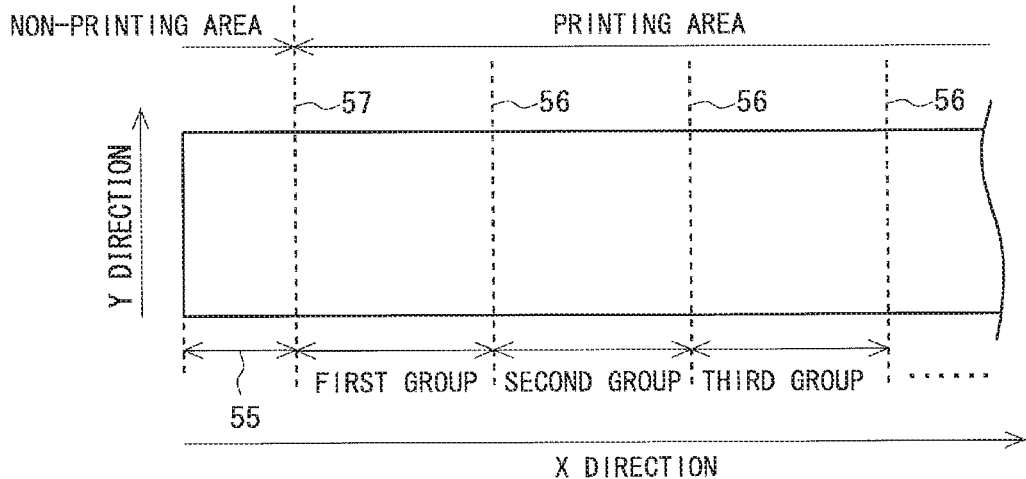
FIG. 9 is a diagram for explaining a boundary in the first embodiment.

In order to generate the histogram HG for each group, it is necessary to obtain the position of the boundary between the groups and the position of the boundary between the printing area and the non-printing area. This will be described with reference to FIG. 9. Given that the conveyance direction of the printing paper is a Y direction and the direction perpendicular to the Y direction is an X direction, the inkjet heads are aligned in the X direction for each color. FIG. 9 shows the printing areas, regarding the X direction, of three groups (the first to third groups) corresponding to inkjet heads different from one another. It should be noted that the offset is indicated by the arrow given the reference numeral 55. The position of the dotted line given the reference numeral 56 in FIG. 9 is the position of the boundary between the groups. The position of the dotted line given the reference numeral 57 in FIG. 9 is the position of the boundary between the printing area and the non-printing area. For example, when information on the gradation value for a pixel in the printing area is obtained, if the position of the boundary between the groups is unknown, it is not possible to perform the processing on the desired histogram HG based on the acquired information on the gradation value. Although it is necessary to exclude a pixel in the non-printing area from the ink consumption amount calculation target, if the position of the boundary between the printing area and the non-printing area is unknown, it is not possible to determine whether or not the acquired data are the ink consumption amount calculation target. Therefore, in the present embodiment, as described below, a boundary list holding a list of boundaries is generated.

<1.4.2.1 Generation of Boundary List>

Figure 10:
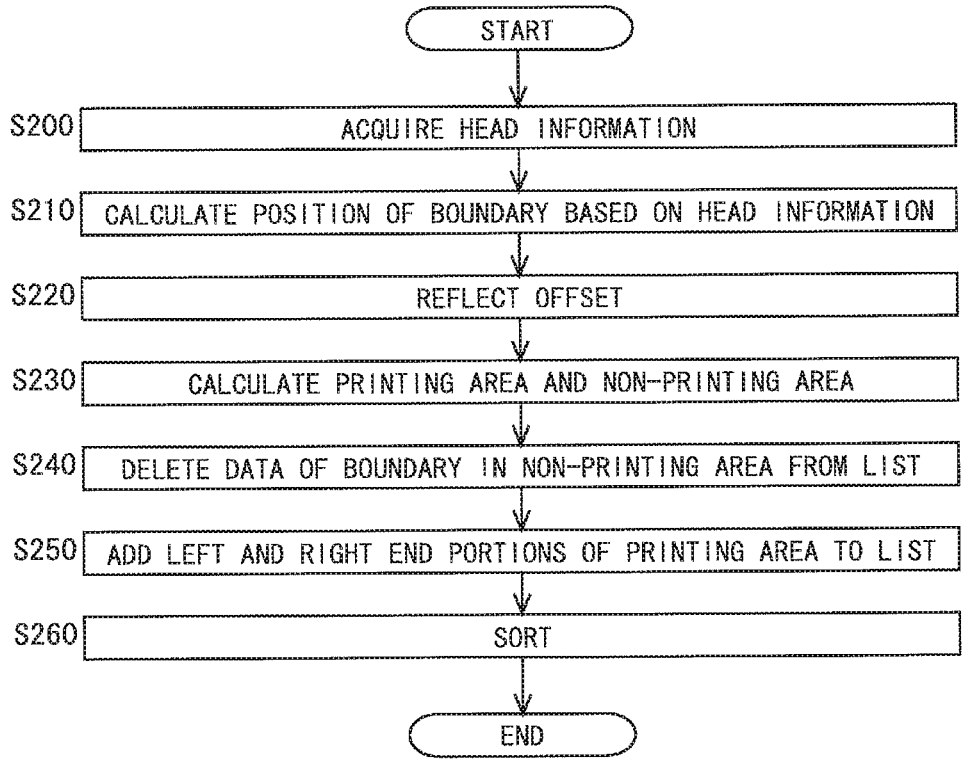
FIG. 10 is a flowchart showing a procedure of generating a boundary list in the first embodiment.

With reference to the flowchart shown in FIG. 10, the procedure for generating a boundary list that holds a list of boundaries will be described. Note that this processing is performed by the image data compression unit 224. First, the head information HI is acquired from the inkjet printing device 300 (S200). Specifically, information on the number of pixels (the number of pixels regarding the X direction) corresponding to the printing area of each inkjet head has been registered in advance in the inkjet printing device 300 as a hardware parameter, and the information is acquired as the head information HI.

Next, the position of the boundary is calculated based on the head information HI (S210). For example, if the printing area regarding the X direction of one inkjet head is 2000 pixels, a boundary appears every 2000 pixels in the X direction. However, the size of the printing area may be different for each inkjet head. It should be noted that, in step S210, for each group, the position of the boundary on one end side (right side in FIG. 9) is calculated. Accordingly, for example, when there are ten groups (inkjet heads), the positions of 10 boundaries are calculated. A provisional boundary list is generated by calculating the position of the boundary of each group as described above.

Next, the offset information OI is acquired from the inkjet printing device 300, and the offset is reflected in the value of each boundary of the provisional boundary list (S220).

Figure 11:
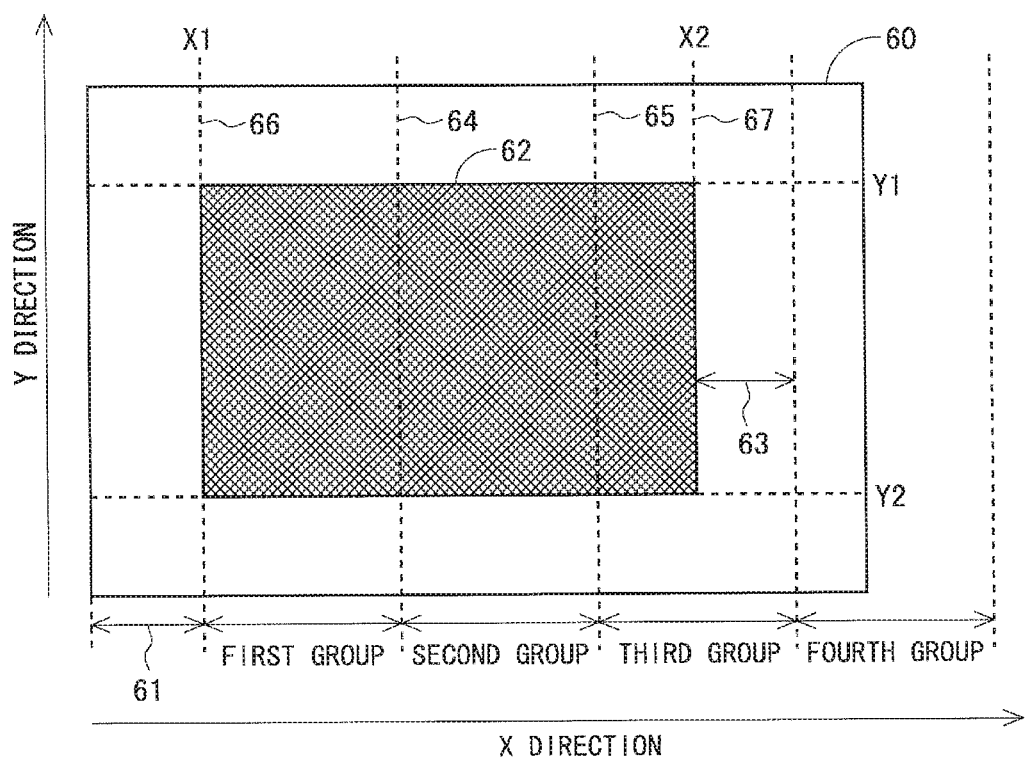
FIG. 11 is a view showing an example of a printing area and a non-printing area in the first embodiment.

Next, the printing area and the non-printing area are obtained also in consideration of information on trimming, mask, and the like (these pieces information are also acquired from the inkjet printing device 300 as the device information DI) in addition to the offset information OI (step S230). FIG. 11 shows an example of the printing area and the non-printing area. In FIG. 11, the rectangular area given the reference numeral 60 corresponds to the entire area of the image based on the RIP data RD, the arrow given the reference numeral 61 corresponds to the offset, and the shaded area given the reference numeral corresponds to the printing area. In this example, the image is shifted relatively to the left due to the offset. Since a corresponding inkjet head is not present in the area corresponding to the offset on the left side of the image, this area is a non-printing area. Regarding a part of the area (the area given the reference numeral 63) on the right side of the image, a corresponding inkjet head is present but the area is a non-printing area based on an instruction (trimming or the like) to limit the printing range. It should be noted that, when updating the data of the histogram HG, it is necessary to consider whether or not the position of the pixel of the processing target is included in the printing area also regarding the Y direction. That is, in the example shown in FIG. 11, it is necessary for the ink consumption amount calculation to target only the data of the pixels of which the X coordinate is within the range from X1 to X2 and the Y coordinate is within the range from Y1 to Y2.

Next, among the data of the boundary included in the provisional boundary list, the data of the boundary positioned in the non-printing area are deleted from the provisional boundary list (step S240). For example, although data of ten boundaries are generated in step S210 when there are ten inkjet heads, if only three inkjet heads are actually used for printing, the boundary information on the remaining seven inkjet heads is unnecessary. For this reason, data of the boundary located in the non-printing area are deleted from the provisional boundary list.

Next, the positions of the left and right end portions of the printing area are added to the provisional boundary list (step S250) as a boundary. For example, in the example shown in FIG. 11, at the end of step S240, only the data of the boundary denoted by the dotted line given the reference numeral 64 and the data of the boundary denoted by the dotted line given the reference numeral 65 are present in the provisional boundary list as the data of the boundary. In this case, it is not possible to grasp the position of the boundary on the left side for the first group, and not possible to grasp the position of the boundary on the right side for the third group. Then, by adding to the provisional boundary list the positions of the left and right end portions of the printing area as boundaries, it is possible to grasp the positions of the boundary on the left and right sides of all the groups.

Finally, a final boundary list is generated by sorting the data of the boundary included in the provisional boundary list in ascending order of the X coordinate (step S260). The data of the boundary in the boundary list generated in this way are used in the main processing of the compressed file generation processing. It should be noted that, in the present embodiment, the group information is realized by the data of the boundary in the boundary list.

<1.4.2.2 Main Processing of Compressed File Generation Processing>

Next, with reference to the flowchart shown in FIG. 12, the procedure of the main processing of the compressed file generation processing will be described. It should be noted that, in this process, scanning of the RIP data RD (that is, the image data after the RIP processing) is performed, and the data of gradation values constituting the RIP data RD are to be processed one by one. At that time, the data of each gradation value are treated as the above-described character (symbol). While this processing is being performed, mode switching is performed between the mode called "continuous" for performing processing on continuous data (data in which the same gradation value is continuous) and the mode called "discontinuous" for performing processing on discontinuous data (data in which change of gradation value is continuous).

The histogram HG is realized by variables prepared for respective gradation values for storing the number of occurrences of corresponding gradation value as described above. However, at the time of start of the compressed file generation processing, the value of the variable is set to 0 for all the gradation values. Then, during the main processing, the value of the corresponding variable is added (the frequency of each gradation value is added) in response to the information of the number of occurrences for each gradation value being obtained. In the following, the process of adding the value of the variable (variable for realizing the histogram HG) corresponding to each gradation value in this way is referred to as "histogram counting processing".

Figure 12:
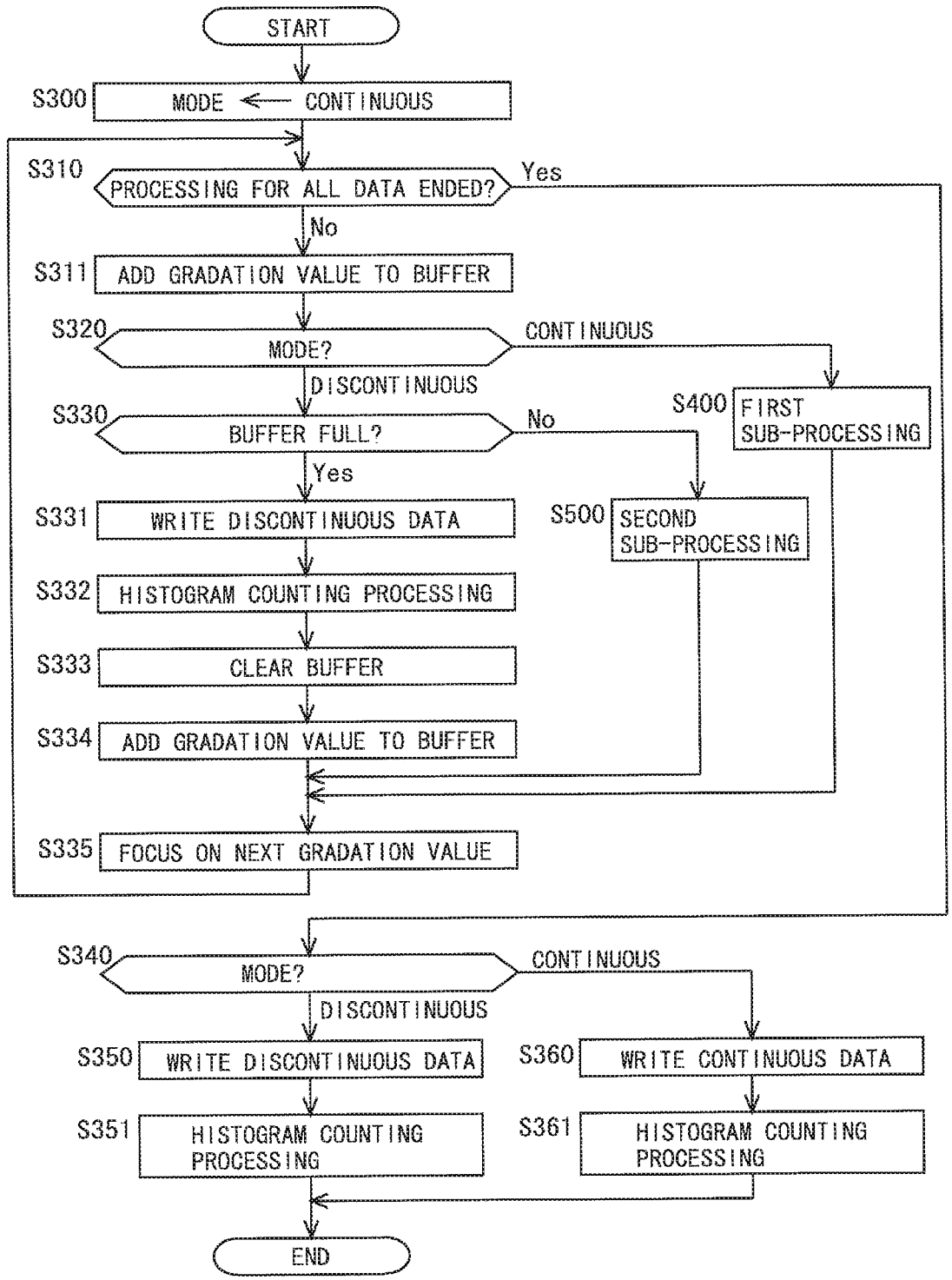
FIG. 12 is a flowchart showing a procedure of the main processing of compressed file generation processing in the first embodiment.

Regarding the flow shown in FIG. 12, first, the mode is set to be continuous in step S300. That is, regardless of whether or not the same gradation value actually continues, the mode is set to be continuous as the initial setting. In step S310, it is determined whether or not the processing for all the data has ended. As a result, if it has ended, the processing proceeds to step S340. On the other hand, if it has not ended, the processing proceeds to step S311.

In step S311, the focused gradation value is added to a buffer. In step S320, the current mode is determined. As a result, if the mode is set to be continuous, the processing proceeds to step S400. On the other hand, if the mode is set to be discontinuous, the processing proceeds to step S330. In step S330, it is determined whether or not the buffer is full. As a result, if the buffer is full, the processing proceeds to step S331. On the other hand, if the buffer is not full, the processing proceeds to step S500.

In step S331, writing of the discontinuous data into the file is performed. In this regard, the buffer can hold up to 128 gradation values. Accordingly, when 128 discontinuous gradation values continue, the data stored in the buffer are written to the file in step S331. In step S331, specifically, the number of times of continuation of the discontinuous gradation value and the series of gradation values stored in the buffer are written in the file as encoded data.

In step S332, the histogram counting processing is performed based on the data of the gradation value stored in the buffer. In step S333, the buffer is cleared. In step S334, the focused gradation value is added to a buffer. In step S335, the gradation value being focused (that is, the gradation value of the pixel to be processed) shifts to the next gradation value (typically, the gradation value of the adjacent pixel).

Figure 13:
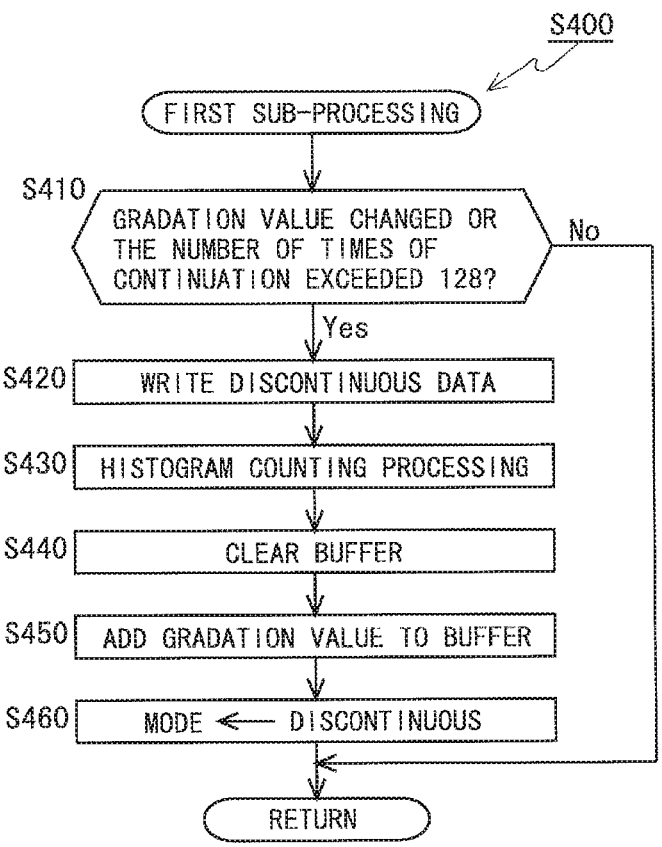
FIG. 13 is a flowchart showing a procedure of a first sub-processing in the first embodiment.
Figure 14:
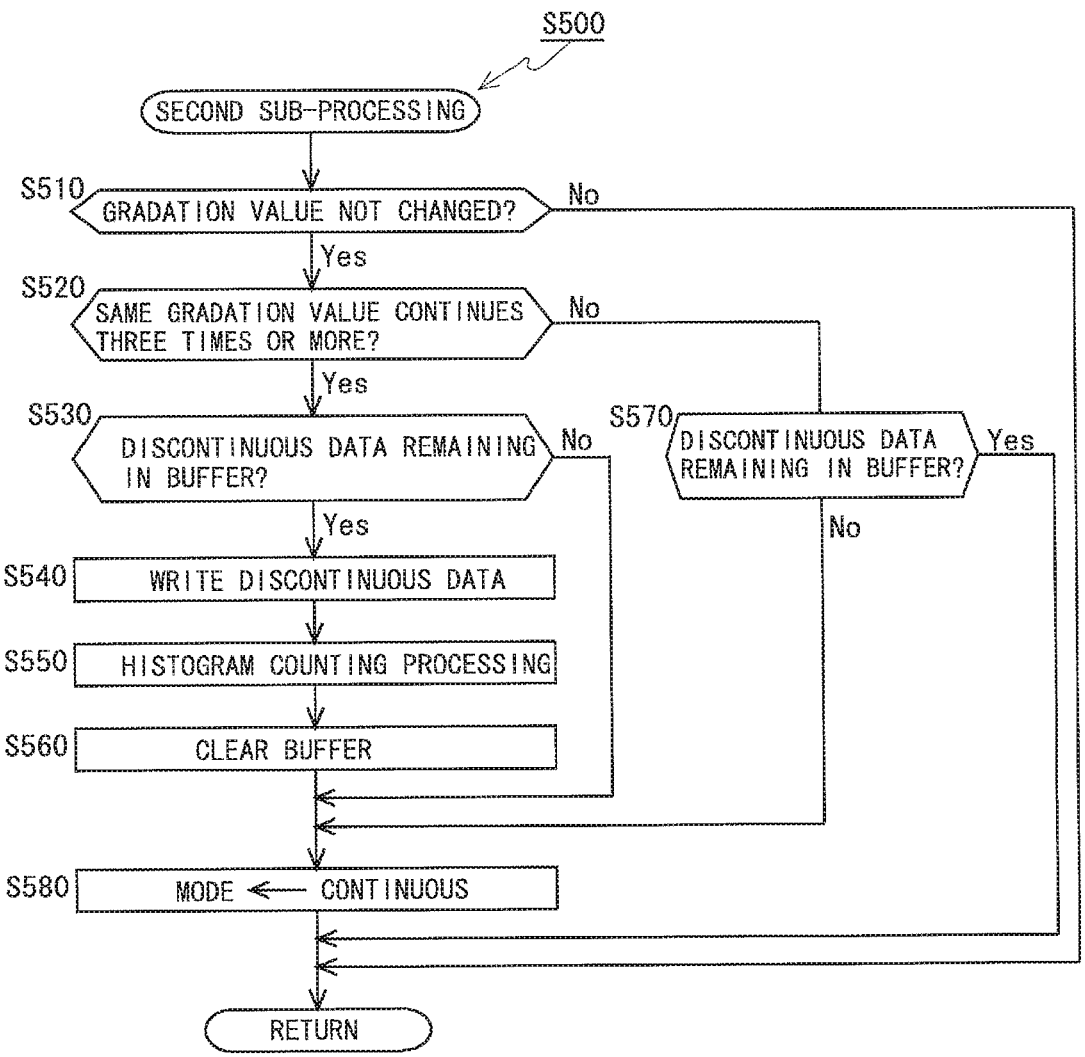
FIG. 14 is a flowchart showing a procedure of a second sub-processing in the first embodiment.

In step S400, the first sub-processing of the flow shown in FIG. 13 is performed. In step S500, the second sub-processing of the flow shown in FIG. 14 is performed. The description of these first sub-processing and second sub-processing will be described later.

In step S340, the current mode is determined. As a result, if the mode is set to be continuous, the processing proceeds to step S360. On the other hand, if the mode is set to be discontinuous, the processing proceeds to step S350.

In step S350, writing of the discontinuous data into the file is performed. Specifically, the number of times of continuation of the discontinuous gradation value and the series of gradation values stored in the buffer are written in the file as encoded data. In step S351, the histogram counting processing is performed based on the data of the gradation value stored in the buffer.

In step S360, writing of the continuous data to the file is performed. Specifically, the number of times of continuation of the same gradation value and the corresponding gradation value are written in the file as encoded data. In step S361, the histogram counting processing is performed based on the information used for writing to the file in step S360.

By ending the processing in step S351 or step S361, the main processing of the compressed file generation processing ends.

The procedure of the first sub-processing (step S400 in FIG. 12) will be described with reference to the flowchart shown in FIG. 13. In step S410, it is determined whether or not either "the gradation value has changed" or "the number of times of continuation of the gradation value exceeds 128" applies. As a result, if either of them applies, the processing proceeds to step S420. On the other hand, if neither of them applies, the first sub-processing ends.

In step S420, writing of the discontinuous data into the file is performed. Specifically, the number of times of continuation of the discontinuous gradation value and the series of gradation values stored in the buffer are written in the file as encoded data. In step S430, the histogram counting processing is performed based on the data of the gradation value stored in the buffer. In step S440, the buffer is cleared. In step S450, the focused gradation value is added to a buffer. In step S460, the mode is set to be discontinuous. As a result, the first sub-processing ends.

The procedure of the second sub-processing (step S500 in FIG. 12) will be described with reference to the flowchart shown in FIG. 14. In step S510, it is determined whether or not the gradation value has changed. As a result, if the gradation value has changed, the processing proceeds to step S520. On the other hand, if the gradation value has not changed, the second sub-processing ends.

In step S520, it is determined whether or not the same gradation value continues three times or more. As a result, if the same gradation value continues three times or more, the processing proceeds to step S530. On the other hand, if the same gradation value does not continue three times or more, the processing proceeds to step S570. In step S530, it is determined whether or not the discontinuous data remain in the buffer. As a result, if the discontinuous data remain, the processing proceeds to step S540. On the other hand, if the discontinuous data do not remain, the processing proceeds to step S580.

In step S540, writing of the discontinuous data into the file is performed. Specifically, the number of times of continuation of the discontinuous gradation value and the series of gradation values stored in the buffer are written in the file as encoded data. In step S550, the histogram counting processing is performed based on the data of the gradation value stored in the buffer. In step S560, the buffer is cleared.

In step S570, it is determined whether or not the discontinuous data remain in the buffer. As a result, if the discontinuous data remain, the second sub-processing ends. On the other hand, if the discontinuous data do not remain, the processing proceeds to step S580. In step S580, the mode is set to be discontinuous. As a result, the second sub-processing ends.

When writing of continuous data or discontinuous data to a file is performed in the flow shown in FIG. 12 to FIG. 14, information on the number of occurrences for each gradation value has been obtained. More specifically, at the time when writing of continuous data or discontinuous data to the file is performed, a pixel group in which the same gradation value is continuous or in which change of the gradation value is continuous has been detected, and information for specifying sequence of the gradation value of the pixel group (hereinafter referred to as "gradation value sequence information") has been obtained. In this regard, in the case where a pixel group in which the same gradation value is continuous has been detected, the gradation value sequence information is composed of information of the number of times of continuation of the gradation value and information of the gradation value itself. In the case where a pixel group in which change of the gradation value is continuous has been detected, the gradation value sequence information is composed of information of the number of times of continuation of change of the gradation value and information of the series of gradation values themselves. Since the gradation value sequence information as described above has been obtained when writing of continuous data or discontinuous data to a file is performed, it is possible to perform concurrently generation of a compressed file (TIFF file TF) and generation of the histogram HG indicating the number of occurrences for each gradation value.

It should be noted that, with respect to the processing shown in FIG. 12 to FIG. 14, an encoded data writing step is realized by step S331, step S350, step S360, step S420, and step S540, a histogram updating step is realized by step S332, step S351, step S361, step S430, step S550, and the gradation value sequence information acquisition step is realized by the remaining steps.

<1.4.2.3 Details of Histogram Counting Processing>

Figure 15:
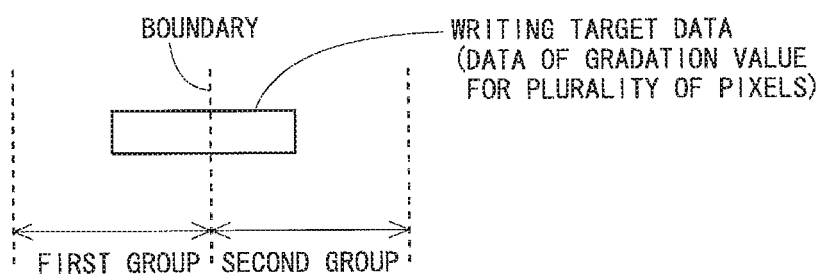
FIG. 15 is a view for explaining that writing target data may cross a boundary in the first embodiment.

As understood from the flowcharts shown in FIG. 12 to FIG. 14, the histogram counting processing is performed every time writing of the continuous data or the discontinuous data to the file is performed. At that time, as schematically shown in FIG. 15, there is a case where the writing target data cross the boundary. That is, there is a case where the number of occurrences (frequency) has to be added to the histograms HG of two or more groups, based on the writing target data. Therefore, how the histogram counting processing is performed in consideration of such a case will be described below. It should be noted that, depending on the content of the image data, the ratio at which the writing target data cross the boundary is considered to be approximately 5%.

Figure 16:
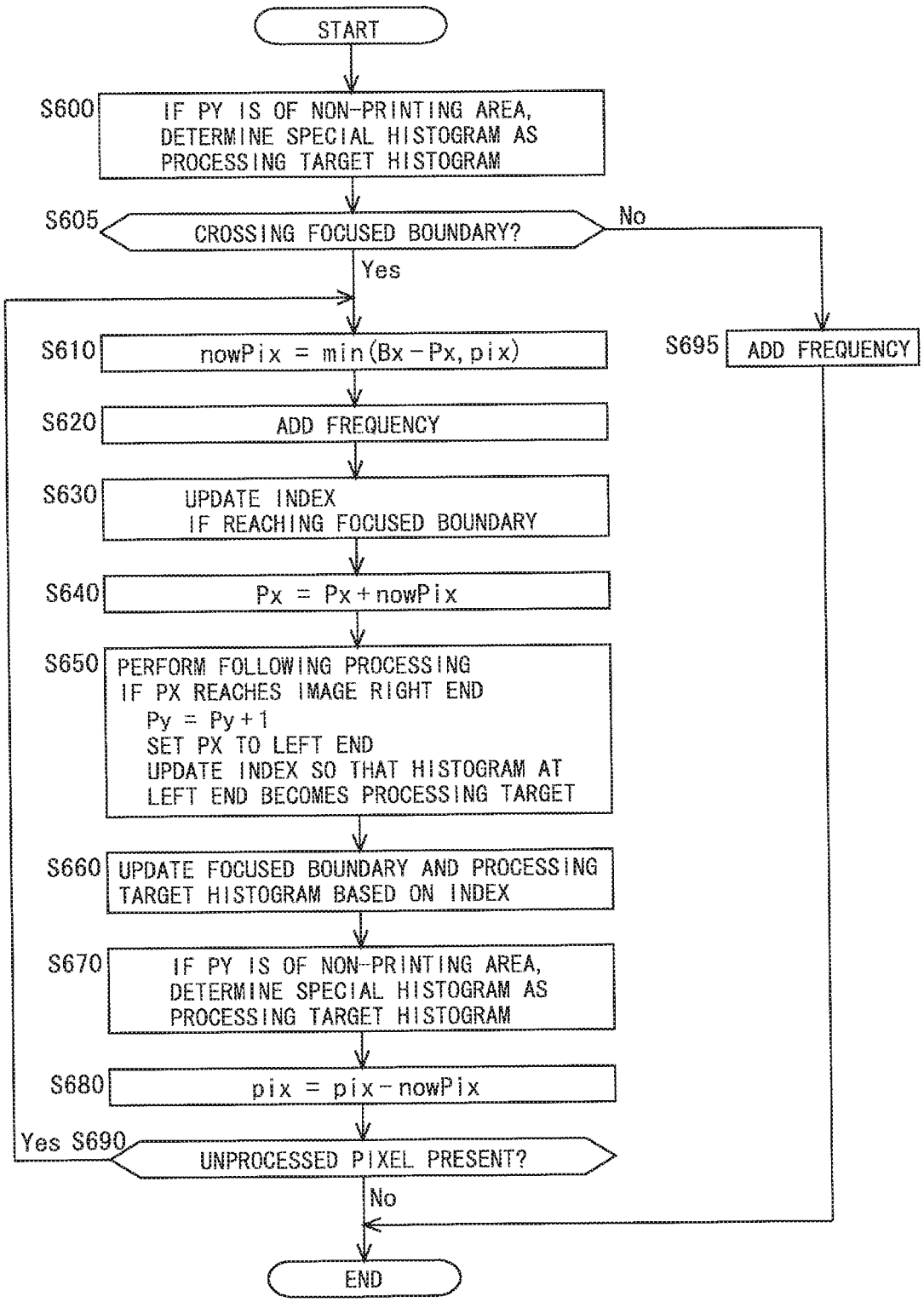
FIG. 16 is a flowchart showing a detailed procedure of histogram counting processing in the first embodiment.

FIG. 16 is a flowchart showing the detailed procedure of the histogram counting processing. It should be noted that this processing uses a variable Px indicative of the X coordinate of the focused pixel, a variable Py indicative of the Y coordinate of the focused pixel, a variable Bx indicative of the X coordinate of a boundary to be focused (hereinafter referred to as a "focused boundary"), and two variables pix and nowPix indicative of the number of pixels subjected to the counting processing. The initial value of the variable Px is set to the X coordinate of the pixel at the head of the writing target data. The initial value of the variable Py is set to the Y coordinate of the pixel at the head of the writing target data. The initial value of the variable pix is set to the number of pixels of writing target data.

In the present embodiment, in addition to the histogram corresponding to each group associated with the printing area, a histogram corresponding to the non-printing area (hereinafter referred to as a "special histogram" for convenience) is prepared. For example, when the printing area is associated with eight groups, a special histogram corresponding to the non-printing area is prepared in addition to the histogram corresponding to each of the eight groups. The special histogram is not used for calculating the predicted ink consumption amount Cink. It should be noted that the configuration may be such that, without preparing such a special histogram, the histogram counting processing is not performed for the data of the pixel of a non-printing area.

Regarding the flow shown in FIG. 16, first, if the value of the variable Py is the coordinate value in the non-printing area, the special histogram is determined to be a processing target histogram (step S600). It should be noted that the processing target histogram at the time of start of the flow shown in FIG. 16 is a processing target histogram when this counting processing is performed the last time, and the boundary on the right side of the group corresponding to this histogram is the focused boundary. However, when this counting processing is executed on the RIP data RD for the first time, the histogram at the left end is determined as the processing target histogram.

Next, a determination is made as to whether or not the writing target data cross the focused boundary (step S605). Specifically, it is determined whether or not the sum of the value of the variable Px and the value of the variable pix is equal to or greater than the value of the variable Bx. As a result of the determination, if the sum of the value of the variable Px and the value of the variable pix is equal to or greater than the value of the variable Bx (if the writing target data cross the focused boundary), the processing proceeds to step S610, otherwise the processing proceeds to step S695. It should be noted that, in the present embodiment, a group determination step is realized by this step S605.

In step S610, the number of pixels for which the frequency is to be added to the processing target histogram is obtained. More specifically, the value of the variable nowPix is set to the smaller one of the value obtained by subtracting the value of the variable Px from the value of the variable Bx and the value of the variable pix. Next, addition of the frequency to the processing target histogram is performed based on the data of the pixels of the number of the value of the variable nowPix with the currently focused pixel as the head (step S620). Next, if the processing based on the data of the pixel immediately before the focused boundary has been performed in step S620, the index provided for identifying the processing target histogram is updated (step S630). Next, the value of the variable nowPix is added to the value of the variable Px (step S640).

Next, if the value of the variable Px has reached the coordinate value of the right end of the image (the image corresponding to the RIP data RD), the following three types processing are performed (step S650).

(a) Adding 1 to the value of the variable Py.
(b) Setting the value of the variable Px to the coordinate value of the left end of the image.
(c) Updating the above index so that the histogram at the left end becomes the processing target histogram.

Next, update of the focused boundary and the processing target histogram is performed based on the index for specifying the processing target histogram (step S660). It should be noted that, only when update of the index has been performed in step S630 or step S650, the focused boundary and the processing target histogram change before and after this step 660.

Next, as in step S600, if the value of the variable Py is the coordinate value in the non-printing area, the special histogram is determined as the processing target histogram (step S670). Next, regarding the writing target data, the number of pixels for which addition of the frequency to the histogram has not been performed is obtained (step S680). Specifically, processing of subtracting the value of the variable nowPix from the value of the variable pix is performed.

Next, it is determined whether or not an unprocessed pixel (pixel for which addition of the frequency to the histogram has not been performed) is present (step S690). Specifically, it is determined whether or not the value of the variable pix is larger than 0. As a result of the determination, if the value of the variable pix is larger than 0 (if an unprocessed pixel is present), the processing returns to step S610, otherwise the histogram counting processing ends.

In step S695, addition of the frequency to the processing target histogram is performed with respect to the data of all the pixels included in the writing target data. It should be noted that, when the processing proceeds to step S695, the histogram counting process ends by ending step S695.

Figure 17:
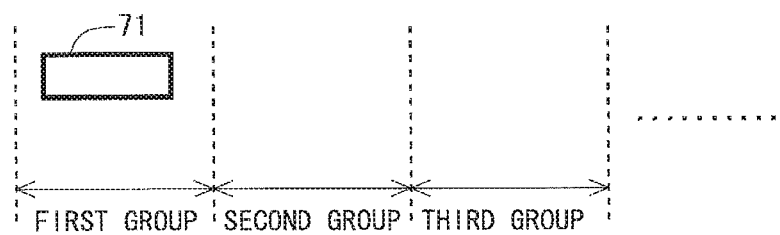
FIG. 17 is a view for explaining the histogram counting processing in the first embodiment.
Figure 18:
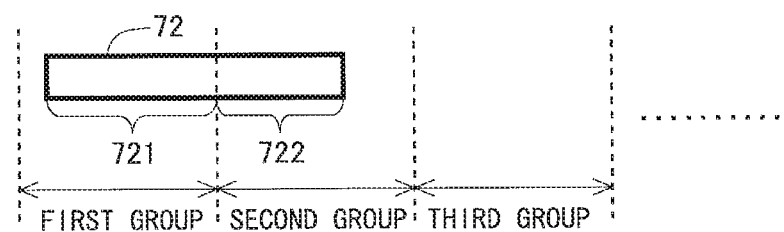
FIG. 18 is a view for explaining the histogram counting processing in the first embodiment.
Figure 19:
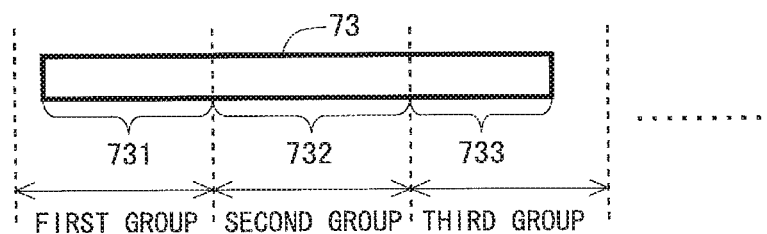
FIG. 19 is a view for explaining the histogram counting processing in the first embodiment.

According to the processing as described above, regardless of whether or not the writing target data at the time of performing the writing process to the file (writing process of encoded data) are present across the areas of two or more groups, addition of the frequency is performed correctly on the histogram of the corresponding group with respect to the data of each pixel. For example, when writing target data 71 include only data of pixels corresponding to the first group as schematically shown in FIG. 17, addition of the frequency to the histogram corresponding to the first group is performed with respect to data of all the pixels included in the writing target data 71. For example, when writing target data 72 include data 721 of the pixel corresponding to the first group and data 722 of the pixel corresponding to the second group as schematically shown in FIG. 18, addition of the frequency to the histogram corresponding to the first group is performed with respect to the data 721 of the pixel corresponding to the first group, and addition of the frequency to the histogram corresponding to the second group is performed with respect to the data 722 of the pixel corresponding to the second group. For example, when writing target data 73 include data 731 of the pixel corresponding to the first group, data 732 of the pixel corresponding to the second group, and data 733 of the pixel corresponding to the third group as schematically shown in FIG. 19, addition of the frequency to the histogram corresponding to the first group is performed with respect to the data 731 of the pixel corresponding to the first group, addition of the frequency to the histogram corresponding to the second group is performed with respect to the data 732 of the pixel corresponding to the second group, and addition of the frequency to the histogram corresponding to the third group is performed with respect to the data 733 of the pixel corresponding to the third group.

<1.5 Effects>

According to the present embodiment, when compression is applied to the RIP data (image data in bitmap format after RIP processing) RD, the histogram HG indicative of the number of occurrences for each gradation value is generated using information obtained for encoding the data. Then, the amount of ink consumed by printing is estimated using the histogram HG and the ink consumption amount table (table holding information on the ink consumption amount for each gradation value) IT prepared in advance. Thus, unlike the conventional method, when estimating the ink consumption amount by printing, it is unnecessary to perform a process of bitmap expansion on image data onto the memory from a file saved in the disk and a process of counting the number of pixels for each gradation value. For this reason, the ink consumption amount is estimated at a speed higher than ever. As described above, according to the present embodiment, it is possible to estimate at a speed higher than ever the ink consumption amount at the time of printing by the inkjet printing device. This makes it easy to simultaneously execute the ink consumption amount estimation processing and another processing by one device without hindering the operation of the inkjet printing device.

Further, according to the present embodiment, the ink consumption amount table IT and the histogram HG are prepared for each group with one inkjet head regarded as one group. Therefore, even when the individual difference of the inkjet heads is large with respect to the ink consumption amount, the ink consumption amount is estimated with high accuracy by taking the sum of the predicted values Cgrp of the ink consumption amount obtained for each group as the predicted ink consumption amount Cink as a whole.

<1.6 Variations>

<1.6.1 Regarding Compression Format>

In the first embodiment described above, an example in which the TIFF file TF is generated by applying Packbits compression to the RIP data RD has been described. However, the present invention is not limited to this. The present invention can be applied also to a case where a compression format other than Packbits compression is adopted as long as compression by run-length encoding is performed.

<1.6.2 Regarding Group>

In the first embodiment described above, one inkjet head corresponds to one group. However, the present invention is not limited to this. For example, one group may be provided for each area obtained by dividing one inkjet head into a plurality of parts in the X direction (that is, one inkjet head corresponds to a plurality of groups), or one group may be provided for each area obtained by dividing the printable area (entire print width) of the inkjet printing device 300 into a plurality of areas.

As described above, the grouping method is not particularly limited as far as one group is provided for each area obtained by dividing the printable area of the inkjet printing device 300 into two or more. It is preferable that the ink consumption amount table IT is provided so as to correspond to each group on a one-to-one basis. That is, the ink consumption amount table IT may be prepared for each group obtained by dividing the printable area of the inkjet printing device 300 into two or more.

<1.6.3 Regarding Method for Calculating Predicted Ink Consumption Amount>

In the first embodiment described above, the predicted ink consumption amount Cink is calculated by generating the histogram HG at the time of the compressed file generation processing and then performing the product-sum operation using the histogram HG and the ink consumption amount table IT. However, the present invention is not limited to this. It is also possible to calculate the predicted ink consumption amount Cink without generating the histogram HG, in the following manner.

In the compressed file generation processing, a variable SUM in which the predicted value of the ink consumption amount is stored is prepared. Then, every time writing of the encoded data to the file (step S331, step S350, and step S360 in FIG. 12, step S420 in FIG. 13, and step S540 in FIG. 14) is performed, the ink consumption amount Ctemp regarding one or more pixel corresponding to data to be written is calculated by the product-sum operation with reference to the ink consumption amount table IT (this processing corresponds to an ink consumption amount calculation step). The obtained ink consumption amount Ctemp is added to the value of the variable SUM (this processing corresponds to an addition operation step). The value of the variable SUM finally obtained in this manner is taken as the predicted ink consumption amount Cink.

2. Second Embodiment

<2.1 Outline of Printing System>

Figure 20:
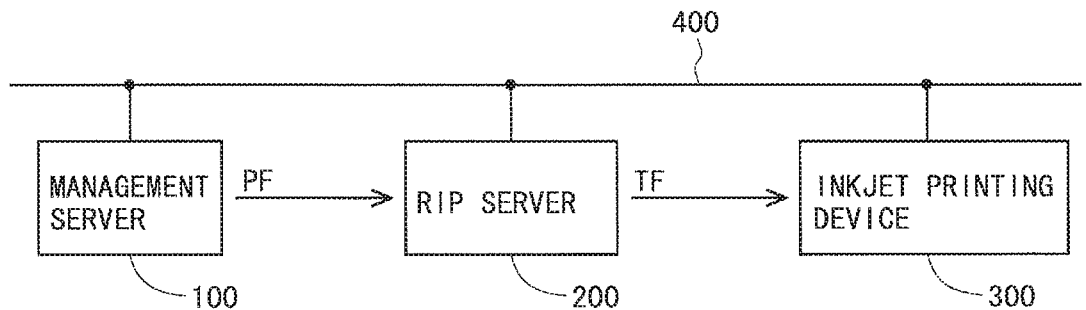
FIG. 20 is an overall configuration diagram of a printing system according to a second embodiment of the present invention.

FIG. 20 is an overall configuration diagram of the printing system according to the second embodiment of the present invention. This printing system is composed of the management server 100, the RIP server 200 and the inkjet printing device 300 as in the first embodiment. In the present embodiment, a PDF file PF is provided as submitted data from the management server 100 to the RIP server 200. In the RIP server 200, the RIP processing is applied to the PDF file PF, and the image data after the RIP processing are stored as a TIFF file TF in a compressed format. The TIFF file TF is sent to the inkjet printing device 300, and the inkjet printing device 300 executes printout based on the decompressed image data of the TIFF file TF.

In the present embodiment, unlike the first embodiment described above, the ink consumption amount estimation processing is performed by the inkjet printing device 300 (more specifically, it is performed by a printing control device in the inkjet printing device 300). Accordingly, transmission of the device information DI and the ink consumption amount table IT from the inkjet printing device 300 to the RIP server 200 is not performed. Further, in the first embodiment described above, the histogram HG for estimating the ink consumption amount is generated at the time of the compressed file generation processing (that is, the generation of the compressed file (TIFF file TF) and the generation of the histogram HG are performed concurrently). In contrast, in the present embodiment, a configuration in which the compressed file (TIFF file TF) having been generated is read in the memory without decompression and the histogram HG is generated based on the encoded data is adopted.

The configuration of the inkjet printing device 300 is the same as that of the first embodiment, and hence the description thereof is omitted (see FIG. 2). While the ink consumption amount estimation processing is performed by the printing control device 310 in the inkjet printing device 300, the hardware configuration of the printing control device 310 is similar to the hardware configuration of the RIP server 200, and hence the description thereof is omitted (See FIG. 3). It should be noted that, in the present embodiment, in the printing control device 310, the image data processing program dedicated to the ink consumption amount estimation processing is stored in the auxiliary storage device, and the image data processing program is read out to the RAM and executed by the CPU.

<2.2 Functional Configuration>

Figure 21:
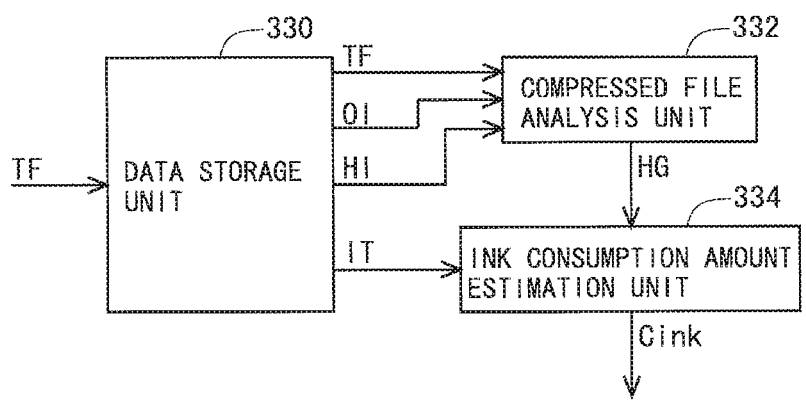
FIG. 21 is a functional block diagram showing a configuration of a function realized by a printing control device of an inkjet printing device by executing an image data processing program in the second embodiment.

FIG. 21 is a functional block diagram showing the configuration of the function realized by the printing control device 310 by executing the image data processing program. As shown in FIG. 21, the printing control device 310 is functionally provided with a data storage unit 330, a compressed file analysis unit 332, and an ink consumption amount estimation unit 334.

In the data storage unit 330, the offset information OI, the head information HI, the ink consumption amount table IT, and the TIFF file TF that is sent from the RIP server 200 are stored. It is assumed that the TIFF file TF is a compressed file obtained by applying Packbits compression to the RIP data RD. Further, it is assumed that the ink consumption amount table IT is provided for each group as in the first embodiment described above. The compressed file analysis unit 332 reads the TIFF file TF, which is a compressed file, without decompressing it, and acquires information on the number of occurrences (frequency) for each gradation value from the encoded data. Then, the compressed file analysis unit 332 generates the histogram HG indicative of the number of occurrences (frequency) for each gradation value for each group based on the acquired information, the offset information OI, and the head information HI. The ink consumption amount estimation unit 334 calculates the predicted ink consumption amount Cink at the time of printing by the inkjet printing device 300, based on information on the number of occurrences for each gradation value obtained from the histogram HG generated by the compressed file analysis unit 332 and information on the ink consumption amount for each gradation value held in the ink consumption amount table IT stored in the data storage unit 330. Details of the image data processing executed by these functional components will be described below.

<2.3 Image Data Processing Method>

<2.3.1 Procedure of Image Data Processing>

Figure 22:
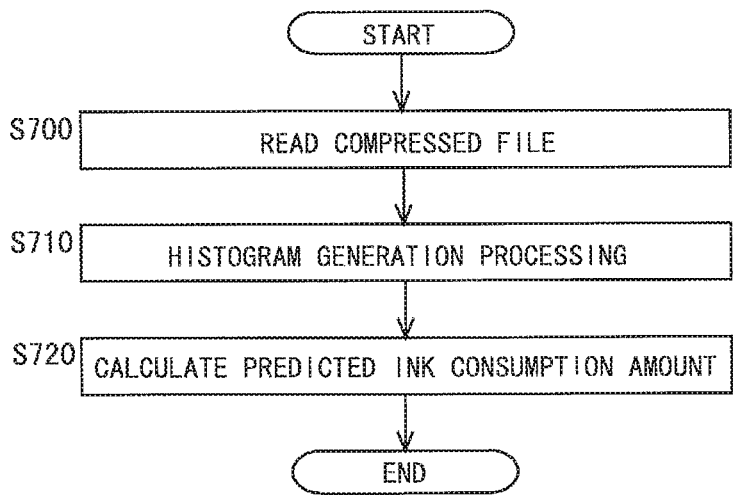
FIG. 22 is a flowchart showing a procedure of image data processing in the second embodiment.

FIG. 22 is a flowchart showing a procedure of image data processing in the present embodiment. Here, it is assumed that the TIFF file TF, which is a compressed file sent from the RIP server 200, has already been stored in the data storage unit 330. In addition, here, the flow of processing will be described focusing on any one color.

First, the compressed file analysis unit 332 reads into the memory the TIFF file TF stored in the data storage unit 330 without decompressing the TIFF file TF (step S700). As a result, the encoded data are directly read into the memory. Next, the compressed file analysis unit 332 acquires information on the number of occurrences (frequency) for each gradation value from the encoded data, and generates the histogram HG for each group based on the information (step S710).

Finally, the ink consumption amount estimation unit 334 calculates the estimated ink consumption amount Cink (step S720). In this regard, information on the number of occurrences for each gradation value is obtained from the histogram HG (see FIG. 6), and information on the ink consumption amount for each gradation value is obtained from the ink consumption amount table IT (see FIG. 7). The histogram HG and the ink consumption amount table IT are prepared for each group (for each inkjet head). Accordingly, as in the first embodiment described above, the predicted value Cgrp of the ink consumption amount is calculated for each group, and the predicted ink consumption amount Cink is calculated by obtaining the sum of the predicted values Cgrp.

It should be noted that, in order to reduce the processing load, the above-described processing may be executed on a part (for example, 10% of the whole) of the TIFF file TF.

<2.3.2 Histogram Generation Processing>

Figure 23:
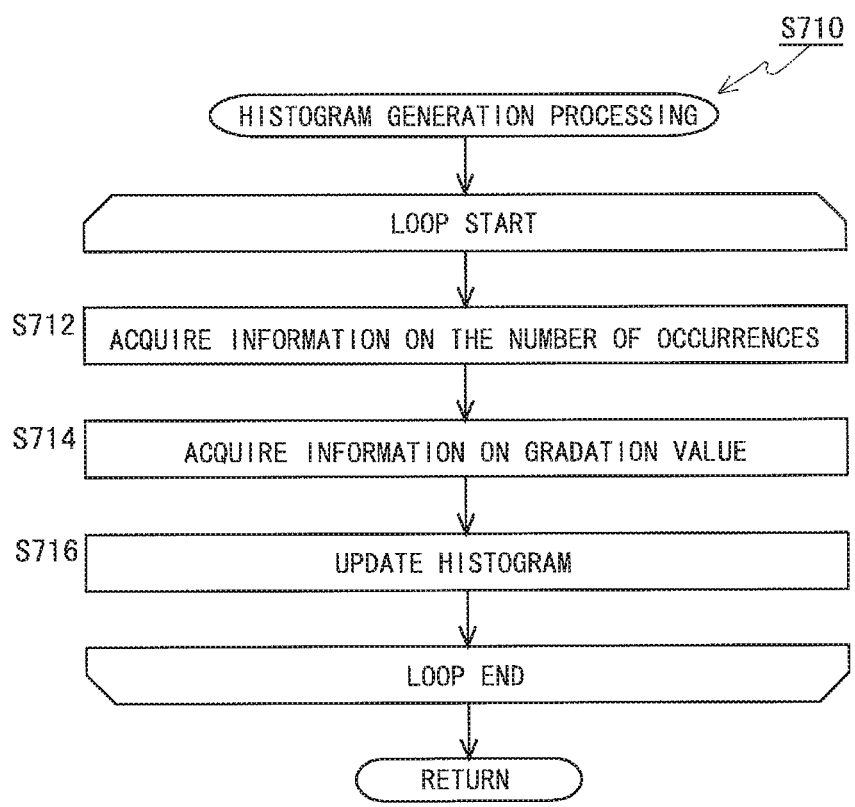
FIG. 23 is a flowchart showing a procedure of histogram generation processing in the second embodiment.

Next, details of the processing (histogram generation processing) of the above-described step S710 will be described with reference to FIG. 23. In this histogram generation processing, the processing of the following steps S712 to S716 is repeatedly executed for the number of times equal to the number of the above-described pixel groups included in the TIFF file TF (in other words, the processing is repeatedly executed for the number of time of writing continuous data or discontinuous data to the file at the time of compressing the RIP data). That is, one pixel group is taken as the processing target in one loop processing of steps S712 to S716.

As described above, in Packbits compression, the value of "−N+1" (integer from −127 to −1) is set to the first byte when a same character is continuous for N times, and the value of "N−1" (integer from 0 to 127) is set to the first byte when non-repetitive characters are continuous for N times. Therefore, in step S712, information on the number of times is acquired from the data corresponding to the first byte.

Further, as described above, in Packbits compression, when a same character is continuous for N times, the corresponding character is set to the second byte, and when non-repetitive characters are continuous for N times, the corresponding N characters are set from the second byte to the (N+1)th byte. Therefore, in step S714, information on the gradation value is acquired from the data corresponding to the second byte if the data corresponding to the first byte is a value from −127 to −1, and information on the gradation value is acquired from the data corresponding to from the second byte to the (N+1)th byte if the data corresponding to the first byte is a value from 0 to 127.

As described above, information on the number of occurrences for each gradation value regarding the processing target pixel group is obtained by steps S712 and S714. In step S716, update of the histogram HG is performed based on the information. Regarding this, also in the present embodiment, as in the first embodiment, the histogram HG is realized by variables prepared for respective gradation values for storing the number of occurrences of corresponding gradation value. At the time of start of this histogram generation processing, the value of the variable is set to 0 regarding all the gradation values. Then, during the histogram generation processing, in response to information on the number of occurrences for each gradation value being obtained, the value of the corresponding variable is added. It should be noted that, also in the present embodiment, a case in which the number of occurrences (frequency) has to be added to the histogram HG of two or more groups may occur. Since the processing for this is the same as that in the first embodiment, the description thereof will be omitted.

Repeating of the processing of steps S712 to S716 as described above generates the histogram HG holding information on the number of occurrences for each gradation value regarding the entire image data corresponding to the TIFF file TF.

<2.4 Effects>

According to the present embodiment, when estimating the ink consumption amount, the compressed file (TIFF file TF) saved on the disk is read into the memory without being decompressed. Based on the information obtained from the encoded data, the histogram HG indicative of the number of occurrences for each gradation value is generated. Then, the ink consumption amount is estimated using the histogram HG and the ink consumption amount table (table holding information on the ink consumption amount for each gradation value) IT prepared in advance. In contrast, conventionally, when the ink consumption amount is estimated, a process of bitmap expansion on the image data onto the memory from a file saved in the disk and a process of counting the number of pixels for each gradation value are performed. From the above, similarly to the first embodiment, also according to the present embodiment, it is possible to estimate at a speed higher than ever the ink consumption amount at the time of printing by the inkjet printing device. This makes it easy to simultaneously execute the ink consumption amount estimation processing and another processing by one device without hindering the operation of the inkjet printing device. Further, also in the present embodiment, the ink consumption amount table IT and the histogram HG are prepared for each group with one inkjet head regarded as one group. Therefore, as in the first embodiment described above, the ink consumption amount is estimated with high accuracy.

<3. Others>

In each of the above-described embodiments (including variations), the example in which prediction of the ink consumption amount is performed in order to determine whether or not the ink runs short during printing has been described. However, the present invention is not limited to this. For example, the present invention can be applied also to a case where prediction of the ink consumption amount is performed in order to calculate the cost required for executing a certain printing job. In this case, a series of processing for predicting the ink consumption amount may be executed by the management server 100.

While the present invention has been described in detail above, the above description is illustrative in all aspects and is not restrictive. It is understood that numerous other modifications and variations can be devised without departing from the scope of the invention.

This application is an application claiming priority based on Japanese Patent Application No. 2018-46235 entitled "Image Data Processing Method and Printing System" filed on Mar. 14, 2018, and the contents of which are herein incorporated by reference.

What is claimed is:

1. An image data processing method, comprising:
an image data compression step of compressing image data after raster image processor (RIP) processing by run-length encoding; and
an ink consumption amount estimation step of calculating a predicted ink consumption amount when printing based on the image data is performed by an inkjet printing device based on information on the number of occurrences for each gradation value obtained when run-length encoding is applied on the image data and information on an ink consumption amount for each gradation value held in an ink consumption amount table prepared in advance.

2. The image data processing method according to claim 1, wherein
the ink consumption amount table is prepared for each group obtained by dividing a printable area of the inkjet printing device into two or more, and
in the ink consumption amount estimation step, a predicted value of an ink consumption amount is calculated for each group, and a sum of predicted values calculated for all groups is taken as the predicted ink consumption amount.

3. The image data processing method according to claim 2, wherein
the image data compression step includes:
a gradation value sequence information acquisition step of detecting a pixel group in which a same gradation value is continuous or in which change of gradation values is continuous by scanning the image data, and acquiring gradation value sequence information that specifies sequence of gradation values of the detected pixel group; and
an encoded data writing step of writing encoded data based on the gradation value sequence information into a predetermined file,
the gradation value sequence information for a pixel group in which a same gradation value is continuous is composed of information on the number of times of continuation of a gradation value and information on a gradation values itself; and
the gradation value sequence information for a pixel group in which change of gradation values is continuous is composed of information on the number of times of continuation of change of gradation values and information on a series of gradation values themselves.

4. The image data processing method according to claim 3, wherein
the image data compression step includes:
a group determination step of determining, every time one pixel group is detected in the gradation value sequence information acquisition step, a group to which each pixel included in a corresponding pixel group belongs based on group information for specifying a positional relationship between the printable area and each group and the gradation value sequence information; and
a histogram updating step of updating, based on information on the number of occurrences for each gradation value obtained from the gradation value sequence information, a histogram indicative of the number of occurrences for each gradation value prepared for each group in consideration of a determination result in the group determination step every time one pixel group is detected in the gradation value sequence information acquisition step, and the ink consumption amount estimation step includes a product-sum operation step of calculating as the predicted value a sum of products of the number of occurrences and an ink consumption amount for all gradation values based on the histogram and the ink consumption amount table for each group.

5. The image data processing method according to claim 3, wherein
the image data compression step includes:
a group determination step of determining, every time one pixel group is detected in the gradation value sequence information acquisition step, a group to which each pixel included in a corresponding pixel group belongs based on group information for specifying a positional relationship between the printable area and each group and the gradation value sequence information; and
an ink consumption amount calculation step of calculating, every time one pixel group is detected in the gradation value sequence information acquisition step, an ink consumption amount for a corresponding pixel group based on information on the number of occurrences for each gradation value obtained from the gradation value sequence information and information on an ink consumption amount for each gradation value held in the ink consumption amount table in consideration of a determination result in the group determination step,
the ink consumption amount estimation step includes an addition operation step of cumulatively adding a calculated ink consumption amount every time the ink consumption amount is calculated in the ink consumption amount calculation step; and
in the ink consumption amount estimation step, an ink consumption amount obtained when the addition operation step ends for all pixel groups included in an entirety of the image data is taken as the predicted ink consumption amount.

6. The image data processing method according to claim 2, wherein the ink consumption amount table is prepared for each head of the inkjet printing device.

7. The image data processing method according to claim 1, wherein
the image data compression step includes:
a gradation value sequence information acquisition step of detecting a pixel group in which a same gradation value is continuous or in which change of gradation values is continuous by scanning the image data, and acquiring gradation value sequence information that specifies sequence of gradation values of the detected pixel group; and
an encoded data writing step of writing encoded data based on the gradation value sequence information into a predetermined file,
the gradation value sequence information for a pixel group in which a same gradation value is continuous is composed of information on the number of times of continuation of a gradation value and information on a gradation values itself; and
the gradation value sequence information for a pixel group in which change of gradation values is continuous is composed of information on the number of times of continuation of change of gradation values and information on a series of gradation values themselves.

8. The image data processing method according to claim 7, wherein
the image data compression step includes a histogram updating step of updating, based on information on the number of occurrences for each gradation value obtained from the gradation value sequence information, a histogram indicative of the number of occurrences for each gradation value every time one pixel group is detected in the gradation value sequence information acquisition step; and
the ink consumption amount estimation step includes a product-sum operation step of calculating as the predicted ink consumption amount a sum of products of the number of occurrences and an ink consumption amount for all gradation values based on the histogram and the ink consumption amount table.

9. The image data processing method according to claim 7, wherein
the image data compression step includes an ink consumption amount calculation step of calculating, every time one pixel group is detected in the gradation value sequence information acquisition step, an ink consumption amount for a corresponding pixel group based on information on the number of occurrences for each gradation value obtained from the gradation value sequence information and information on an ink consumption amount for each gradation value held in the ink consumption amount table;
the ink consumption amount estimation step includes an addition operation step of cumulatively adding a calculated ink consumption amount every time the ink consumption amount is calculated in the ink consumption amount calculation step; and
in the ink consumption amount estimation step, an ink consumption amount obtained when the addition operation step ends for all pixel groups included in an entirety of the image data is taken as the predicted ink consumption amount.

* * * * *